Figure 1:
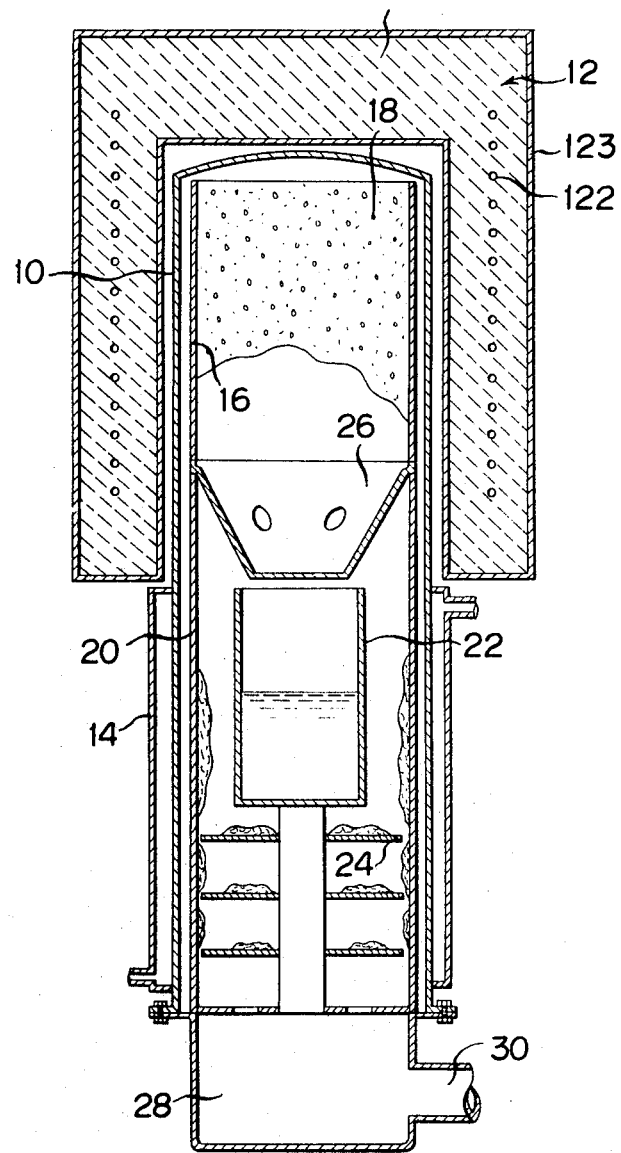

United States Patent
Ishizuka

[15] 3,663,001
[45] May 16, 1972

[54] VACUUM SEPARATOR

[72] Inventor: Hiroshi Ishizuka, 19-2 Ebara, 6-chome, Shinagava-ku, Tokyo, Japan

[22] Filed: Apr. 16, 1969

[21] Appl. No.: 816,610

[30] Foreign Application Priority Data

Apr. 18, 1968 Japan.....................................43/26074

[52] U.S. Cl. ..............................................266/34 V
[51] Int. Cl. .................................................C21c 7/10
[58] Field of Search.....................................266/37

[56] References Cited

UNITED STATES PATENTS 2,482,127   9/1949   Schlechten et al.......................266/37

Primary Examiner—James M. Meister
Attorney—Waters, Roditi, Schwartz & Nissen

[57] ABSTRACT

A vacuum separator of metal for separating impurities from half-refined metal prepared by reducing a metal chloride by a metallic reducing agent. The impurities include the surplus or unreacted metallic reducing agent and reaction by-products. The vacuum separator comprises a body and a heating furnace. The body accommodates an inner cylindrical member with a carrier means carrying reduced half-refined metal to be treated. The body includes an upper portion holding the inner cylindrical member, and a lower portion receiving the surplus or unreacted reducing agent and the reaction by-products. The furnace includes a conduit connected to a vacuum pump to reduce the inner pressure of the body, a first portion heating the inner cylindrical member held by the upper portion of the body, and a second portion heating the lower portion of the body. The second portion of the furnace melts away crusts deposited in the vessel as solid substance firmly adhered to the wall of the lower portion of the body.

5 Claims, 2 Drawing Figures

VACUUM SEPARATOR

This invention relates to a vacuum separator, and more particularly to a vacuum separator for refining metals.

Some metals, such as titanium and zirconium, have a high melting point and are active at high temperatures, and accordingly, it is difficult to refine them. What is called the "Kroll process" has been used for refining those metals which are difficult to refine, in which a chloride of the metal is reduced by a metallic reducing agent, such as magnesium or sodium. The reduced product obtained according to the Kroll process is spongy and contains impurities consisting of reaction by-products including chlorides (e.g., magnesium chloride or sodium chloride) and reaction remainders, such as non-reacted raw material chlorides and unreacted reducing agent. In order to produce the desired pure metal in the spongy form, the impurities must be completely eliminated from the reduced half-refined product, as far as possible.

In a known method of refining, the half-refined product obtained according to the Kroll process (hereinafter referred to as simply as "raw material") is cut into chips, for instance, by a lathe and the chips are further refined through an acid treatment. A more popular refining method is to use a vacuum separator adapted to hold a vessel for the raw material, e.g., an inner cylindrical member, which is directly placed in the vacuum separator for refining raw material by vacuum distillation.

A conventional device for such vacuum separation comprises an upper inner cylindrical member accommodating raw material to be refined; a furnace heating said upper inner cylindrical member; a lower inner cylindrical member having a suction opening connected to a vacuum pump; a means for cooling the lower inner cylindrical member; and a vessel disposed in said lower inner cylindrical member for receiving reaction by-products and reducing agent. The known device, however, has a number of disadvantages. Namely, after separating impurities, the resulting refined spongy metal products must be transferred to the next treating step either by raising the furnace and the body, or by lowering the inner cylindrical members of the device, and then crusts formed at the cooling means should be removed by crushing. The crusts are solidified deposits adhered to the surface of the cooling means and made of by-products of the preceding refining process and the metallic reducing agent. In other words, the known device is operated in the so-called batch process, in which all the component elements of the device should be reassembled for each refining operation. Moreover, the crushing of the crusts is done manually by using considerable time and man-power. The metallic reducing agent and the by-products in the crusts are in the form of tightly adhered mixture, and thus they cannot be utilized directly unless they are separated each other. Accordingly, the yield of their recovery is low.

Therefore, a principal object of the present invention is to provide a vacuum separator of sturdy construction for refining those metals which are difficult to refine, which overcomes and obviates the aforesaid disadvantages of the conventional apparatus for the refining.

A specific object of the present invention is to provide a vacuum separator for refining metals, in which a cooling portion itself can also be heated for facilitating the melting of crusts deposited thereon so as to discharge the melted crust to the outside of the separator, thereby simplifying the conventional complicated process of crust removal. With the vacuum separator according to the present invention, the refining process can be remarkably simplified and considerable saving in man-power can be expected.

Another specific object of the present invention is to provide a vacuum separator of the aforesaid construction, which facilitates the separation of the melted crusts into the reaction by-products and the reducing agent, whereby the recovery yield of the reducing agents is remarkably improved and, at the same time, the tedious process of the separation of the crust components outside the vacuum separator can be completely eliminated.

Figure 2:
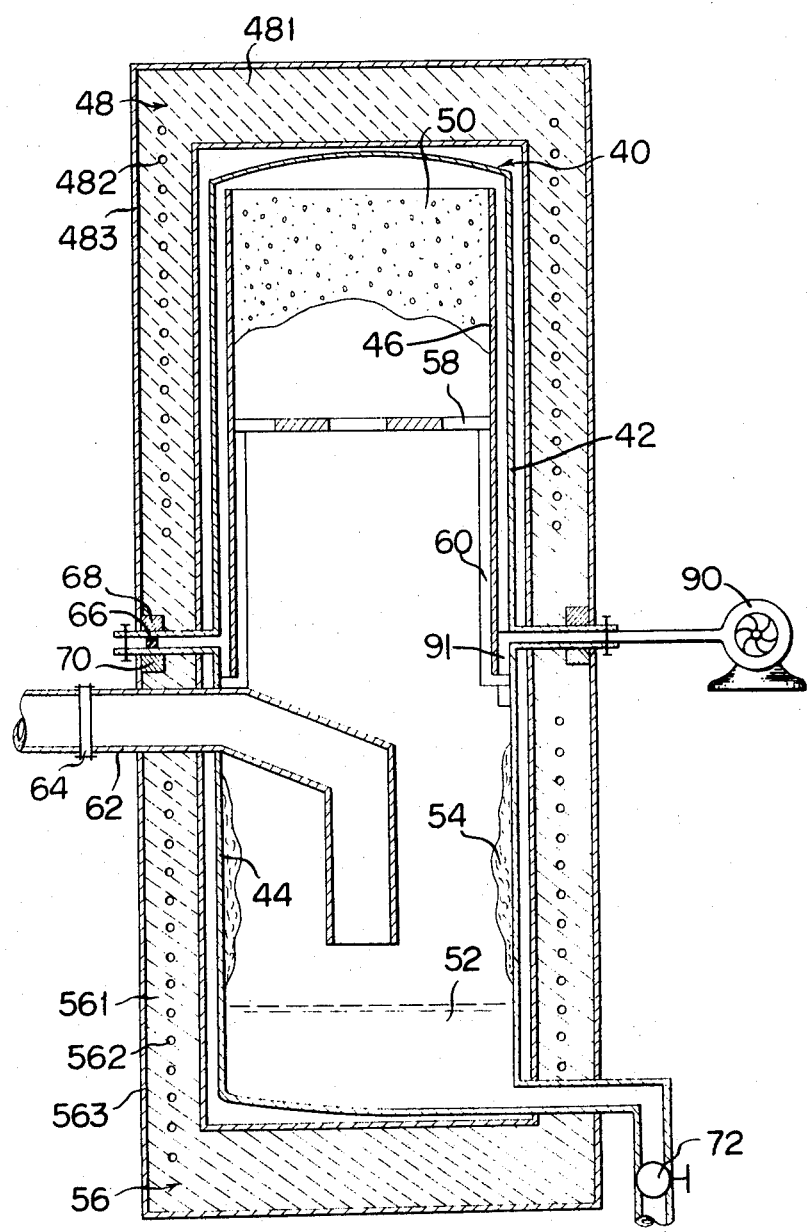

Other objects and a fuller understanding of the present invention may be had by referring to the following description to be taken in conjunction with the accompanying drawings, in which;

FIG. 1 is a vertical sectional view of a prior art or conventional vacuum separator; and FIG. 2 is a vertical sectional view of a vacuum separator according to the present invention.

For refining metal with the conventional device in FIG. 1, the raw material 18 is loaded in an upper inner cylindrical member 16, mounted within the body 10. The funnel-shaped member 26 and a lower inner cylindrical member 20 are connected to inner cylindrical member 16, and a lid 28 leading to a vacuum spum (not shown) is airtightly fitted to the body 10. The body 10 is thereafter evacuated by the vacuum pump through the suction opening 30 to a pressure of about $10^{-4}$ mmHg to $10^{-5}$ mmHg. The heating furnace 12 with heating coils 121 embedded in fire brick 121 surrounded by a housing 123 heats the thus evacuated body 10 from the outside, so that the upper inner cylindrical member 16 is heated to about 1,000° C.

If magnesium is used as the reducing agent in the Kroll process, the surplus or unreacted magnesium in the raw material 18 begins to evaporate at about 500° C and is completely evaporated at about 850° C. At the same time, the reduction by-product consisting of magnesium chloride begins to evaporate at about 650° C and completely evaporated at about 1,050° C. The vapor of magnesium and magnesium chloride evaporated from the raw material 18 is cooled and condensed in cooling jacket 14 and collected in the vessel 22. A part of the vapor, however, solidifies and adheres to the inner surface of the lower inner cylindrical member 20 and to the plates 24, and forms crusts. Upon completion of the refining process by the heating separator, the body 10 is raised or the inner members are lowered, so that the refined product in the upper inner cylindrical member 16 can be removed for transferring to the next process.

Then, the magnesium and the magnesium chloride in the vessel 22 are recovered, and the crusts deposited on the inner surface of the cooling jacket and the plates are manually crushed and scraped. Thus, the refining operation is completed.

The crusts thus crushed and scraped contain the surplus or unreacted metallic reducing agent and the chloride thereof in the state of firmly adhered mixture. As a result, in order to separate the reducing agent and the by-product chloride for reuse, the crusts must be melted again. In other words, the crusts cannot be used directly.

The vacuum separator according to the present invention will now be described in detail, referring to FIG. 2. As can be seen from FIG. 2, the upper portion of the separator of the invention is substantially identical with that of the conventional separator as described hereinbefore, with reference to FIG. 1. It should be noted, however, that a body 40 of the vacuum separator of the present invention consists of an upper portion 42 and a lower portion 44, which can be completely separated one another at about the center of the body 40. An upper heating furnace 48 covered by iron housing 483 wherein a heating element 482 is embedded in a fire-brick 481, heats an inner cylindrical member 46 mounted in the upper portion 42 of the body, so that the raw material 50 loaded in the inner cylindrical member 46 can be heated to evaporate the surplus or unreacted reducing agent and the by-product chloride contained in said raw material 50. The lower inner cylindrical member 44 accommodates condensed and/or solidified reducing agents and the by-products, which are represented by 52 and 54 in FIG. 2. The vapor evaporated from the raw material 50 by the upper heating furnace 48 is cooled by gas forced into the vacuum separator by a blower 90 connected to an inlet 91 provided between the upper portion 42 and the lower portion 44 of the body. A part of the vapor condenses on the inner wall of the lower portion 44 of the body to form crusts 54, but a lower heating furnace 56 similar to that of the upper heating furnace and covered by iron housing 563 wherein a heating element 562 is embedded in a fire-brick, heats and melts away such crusts 54.

The raw material 50 is loaded in the inner cylindrical member 46 having a grate or a carrier 58 which is held by a support 60. A vacuum pump (not shown) is connected to a conduit 62 through a suitable connecting means 64, so that the inner pressure of the body 40 can be reduced. The upper portion 42 and the lower portion 44 of the body 40 are separably or detachably connected together with a packing 66 inserted therebetween. The packing 66 is, for instance, made of heat-resisting rubber and provided with suitable protective cooling jackets 68 and 70.

With the vacuum separator of the aforesaid construction, according to the present invention, the refining can be carried out substantially in the same manner as that of the known separator, and the refined spongy product of the difficulty refinable metal can be removed from the upper inner cylindrical member 46 by raising only the upper heating furnace and the upper portion 42 of the body. At the same time, the crusts 54 are heated to about 800° C and melted by the lower heating furnace 56, and then collected in the lower portion 44 of the body. Furthermore, due to the difference of the specific gravity, the reducing agent and chloride as the reduction by-product are collected in two separate molten layers at the bottom of the lower portion 44 of the body. Accordingly, the reducing agent and chloride can be separated by properly opening and closing a valve or a cock 72 communicated with the lowest part of the bottom of the lower portion 44. The recovered reducing agent is stored or conveyed to the reducing process for reuse, while the chloride is transferred to an electrolytic process.

Furthermore, with the vacuum separator according to the present invention, the removal of the impurities from the lower portion of the separator body does not affect the succeeding refining operation. In other words, there is no need for removing the impurities, such as crusts, deposited in the lower portion of the body at the end of each refining operation. In fact, according to the vacuum separator of the present invention, it is possible to repeat the refining process several times without removing the impurities from the vacuum separator body, so that the impurities collected during the preceding several refining processes can be removed at one time after completion of the repeated refining processes. Thus, the overall refining process is greatly simplified, and considerable saving is possible in man-power. With the collection of the reducing agent and by-product chloride in the form of separate molten layers, the recovery yield of the reducing agent and by-product chlorides is considerably improved, and the economy of the overall process is improved.

EXAMPLE:

3,330 Kg of the raw material which had been manufactured by reacting 760 Kg of metallic magnesium with 2,600 Kg of zirconium tetrachloride in a reduction furnace and by cooling the reaction products, and which comprises 1000 Kg of metallic zirconium, 230 Kg of unreacted metallic magnesium and 2,100 Kg of magnesium chloride, was refined with use of an apparatus as specified in the followings.

Upper portion 42 of the body 40:
   iron cylindrical member
      inner diameter      1150 mm.
      thickness      40 mm.
      length      2500 mm.

Lower portion 44 of the body 40:
   iron cylindrical member
      inner diameter      1500 mm.
      thickness      30 mm.
      length      3300 mm.

Inner cylindrical member 46:
   iron cylindrical member
      inner diameter      1075 mm.
      thickness      14 mm.
      length      2100 mm.

The raw material was loaded within this inner cylindrical member.

Grate or carrier 58:
   stainless steel disc member having a large number of opennings each of which diameter is about 25 mm.

Upper heating furnace 48:
   electrical heating type furnace of fire-bricks
      outer diameter      2200 mm.
      inner diameter      1300 mm.
      length      3000 mm.

Lower heating furnace 56:
   similar type to the upper heating furnace.
      outer diameter      2200 mm.
      inner diameter      1800 mm.
      length      3300 mm.

The elements as specified hereinabove were arranged as shown in FIG. 2. After having reduced the inner pressure of the body 40 to near vacuum state, argon gas was charged into the body 40 so to make the inner pressure thereof to about 0.1 Kg–0.3 Kg/cm$^2$, and then the upper portion 42 of the body 40 was heated by the upper heating furnace 48 to about 800°–850° C to melt about 90 percent of magnesium chloride and about 50 percent of unreacted metallic magnesium both of which are contained in the raw material 50 as the impurities. Then, the lower portion 44 of the body 40 was cooled and, at the same time, the upper portion 42 thereof was heated for 24 hours at about 950° C, the inner pressure of the body 40 being reduced to $10^{-4}$–$10^{-5}$ mm Hg by a pump through the conduit 62 so as to retain only about 1,000 Kg of metallic zirconium in the inner cylindrical member. The resulting sponge like shaped metallic zirconium is quite pure and contains a smaller amount of oxygen than that as separated with use of a conventional process and apparatus as illustrated in FIG. 1 and thus the yield thereof according to the present invention is improved at least about 5 percent as compared with that of the conventional process.

After completion of the reaction, the upper heating furnace 48 and the upper portion 42 of the body 40 were raised to remove the inner cylindrical member 46 accommodating the resulting refined metallic zirconium and to mount a fresh inner cylindrical member in which the fresh raw material has been charged.

The rearranged apparatus, in which the inner cylindrical member accommodates the fresh raw material, was operated in the manner as referred to above.

After such refining operations were repeated several times, a step for melting and removing impurities including crusts was carried out together with the next refining step or as a separate step from said refining. The impurities removing step was carried out by heating the lower portion 44 of the body 40 with the use of the lower furnace at about 800°–850° C and by discharging melted impurities through the valve 72.

In this case, the unreacted metallic magnesium was recovered at a rate of about 220 Kg/l batch which corresponds to 95 percent or more, and magnesium chloride was recovered at a rate of about 2,100 Kg/l batch which corresponds substantially to 100 percent. This shows the excellent advantages of the present device as compared with the following data as attained by the conventional device.

|  | recovering rate |
|---|---|
| metallic magnesium | about 70 % |
| magnesium chloride | about 80 % |

Although the present invention has been described with a certain degree of particularity, it is to be noted that the present disclosure has been made only by way of example and that numerous changes in details of construction and the combination and arrangement of parts may be resorted to without departing from the spirit and the scope of the invention as hereinafter claimed.

I claim:

1. A vacuum separator for separating unreacted reducing agent and reaction by-product from half-refined metal prepared by reducing chloride of a metal with a metallic reducing agent, said separator comprising an inner cylindrical member, including means for carrying the half-refined reduced metal to be refined; a body including a first portion for accommodating said inner cylindrical member and a second portion for accommodating the reducing agent and the by-product fractionally evaporated from the half-refined metal; heat resisting means interposed between said first and second portions for interconnecting said latter portions to one another; conduit means connected to a vacuum pump for reducing the inner pressure of said body; and furnace means including a first portion for heating said inner cylindrical member and a second portion for heating said second portion of the body; such that crusts deposited on the inside walls of said second portion of the body are heated and melted by said second portion of said furnace means.

2. A vacuum separator according to claim 1 wherein said heat resisting means comprises a packing and protective cooling means interposed between said first and second portions of the body, such that said first portion can be separated from said second portion for loading said inner cylindrical member with the half-refined metal and for removal of refined metal.

3. A vacuum separator according to claim 1 and further comprising a cooling gas inlet provided between said first and said second portions of said body, said cooling gas inlet being connected to an outside blower for feeding cooling gas to condense said fractionally evaporated impurities.

4. A vacuum separator according to claim 1 and further comprising a conduit means communicating with the bottom of said lower portion of the body and having a valve means mounted on said conduit means, whereby said molten reducing agent and reaction by-product, including said molten crusts, are led to the outside of the separator while separating the reducing agent from the reaction by-product by utilizing the difference of specific gravities therebetween.

5. A vacuum separator according to claim 1, wherein said body is completely surrounded by said furnace means.

* * * * *